United States Patent

[11] 3,626,968

| [72] | Inventor | Peter D. Hancock<br>Racine, Wis. |
|---|---|---|
| [21] | Appl. No. | 70,357 |
| [22] | Filed | Sept. 8, 1970 |
| [45] | Patented | Dec. 14, 1971 |
| [73] | Assignee | Twin Disc, Incorporated<br>Racine, Wis. |

[54] PRESSURE RISE DELAY VALVE
15 Claims, 5 Drawing Figs.

[52] U.S. Cl. .................................................. 137/115,
137/513.3, 192/85
[51] Int. Cl. ........................................................ F16k 17/04
[50] Field of Search............................................ 137/115,
513.3; 192/85

[56] References Cited
UNITED STATES PATENTS

| 3,084,709 | 4/1963 | Flick ........................... | 137/513.3 X |
| 3,339,574 | 9/1967 | Erb................................ | 137/115 X |
| 3,524,465 | 8/1970 | Sadler........................... | 137/115 |

Primary Examiner—Harold W. Weakley
Attorney—James E. Nilles

ABSTRACT: A valve for controlling the application of fluid pressure to an actuating device and which provides a brief dumping of a portion of the pressure fluid and consequently a gradual rise in pressure. The valve includes two parts which move in the same direction, that is, the piston which moves first in one direction when initial pressure is applied, and a popper which then moves in the same direction. The piston and poppet are abuttable to form a fluid valve which regulates the dumping of pressure fluid. The poppet includes an orifice through which fluid flows to the rear of the poppet when pressure is applied to the valve, to consequently cause the poppet to move in the same direction as the piston. The poppet also includes a check valve for providing a quick return of the poppet and piston a reset position. The orifice and check valve can be combined together in the poppet as a unit, and because they are both located in the time control poppet, no extra fluid lines are required to the poppet.

PATENTED DEC 14 1971       3,626,968

INVENTOR:
PETER D. HANCOCK
BY: James E. Nilles
ATTORNEY

PRESSURE RISE DELAY VALVE

BACKGROUND OF THE INVENTION

The invention pertains to control valves for fluid power operated systems such as clutches and the like, and which valves regulate the rise of pressure to an element to thereby provide a much smoother and shock-free engagement of the element, such as a clutch, for example.

Prior art valves of this general character have been proposed and have been successful in many respects in performing the functions for which they are designed. An example of such a valve is shown in U.S. Pat. No. 3,042,165, issued June 3, 1962, to E. C. Yokel and which has been assigned to an assignee common with the present application. The device shown in that patent is in the nature of a relief valve and the adjustment tends to increase in value as the valve moves. This prior art valve also includes two shiftable parts, one of which moves in one direction and the other part initially moves in an opposite direction and then the first part reverses its direction. This reversal of one of the parts, such as the main regulating piston, is undesirable because of the inertia effect of reversing and also because of the time delay caused by the necessity of such reversal.

Another example of the prior art which operates in a similar manner to the said Yokel patent and has the same shortcomings, is U.S. Pat. No. 2,935,999, issued May 10, 1962, to J. Hock et al. Still another example of this general type of prior art is the U.S. Pat. No. 3,215,236, issued Nov. 2, 1965, to P. Pensa and which includes a pilot relief valve and plunger biased by a spring.

SUMMARY OF THE INVENTION

The present invention provides a valve for a fluid system, which valve controls the rate of rise of pressure and includes two shiftable parts, a regulating piston and a poppet, both of which move in the same direction during operation, the actual valve through which the fluid passes being formed by the abutment of the piston and poppet.

A more limited aspect of the invention provides such a poppet having an orifice through which fluid flows due to the poppet pressure differential and moves the poppet in the same direction as the piston at a speed determined by the orifice size. The piston moves far enough to allow the flow to be relieved to tank. In order to continue relieving, the piston will continue moving ahead of the poppet. Pressure increases as the piston compresses the spring. The poppet also includes a check valve which insures quick return of the piston when pressure is removed from the valve. The orifice and the check valve can furthermore be combined into a single unit for installation in the poppet, and because the poppet contains both the orifice and said check valve, additional fluid lines to this time control poppet are unnecessary. Two functions are combined in the shiftable poppet.

The arrangement of the valve is such that a fluid valve is formed by and between the moving poppet and piston, which poppet and piston move in the same direction during the application of pressure to the system, but they do not necessarily move at the same rate.

The controlled rate of pressure rise valve provided by the present invention includes two shiftable elements, a piston and a poppet both of which move in the same direction, the poppet following up the piston due to pressure fluid admitted by means of an orifice to the back side of the poppet. The orifice determines just how fast the poppet will follow the piston and thereby determines the rate of pressure rise at the valve. The piston moves far enough to relieve the flow. A spring is provided for biasing the piston and this spring is adjustable, whereby the pressure range of the valve can be readily set. Thus, the spring determines the range of pressure that is controlled by the valve made in accordance with the present invention.

By providing a check valve in the poppet, the fluid behind the poppet is permitted to dump quickly and thereby provides a quick reset of the valve.

These and other objects and advantages of the present invention will appear hereinafter as this disclosure progresses, reference being had to the accompanying drawings.

DESCRIPTION OF THE PREFERRED EMBODIMENT

Figure 1:
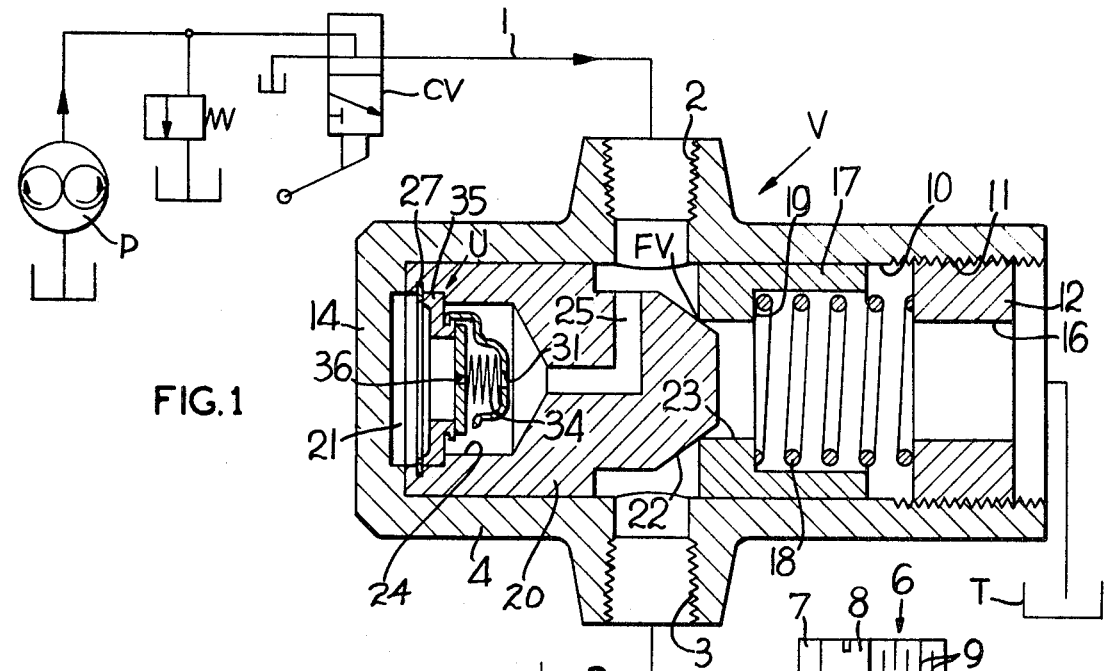
FIG. 1 is a longitudinal, cross-sectional view through a valve made in accordance with the present invention, and showing a generally schematic fluid circuit diagram with which the valve is used.
Figures 2, 3, 5:
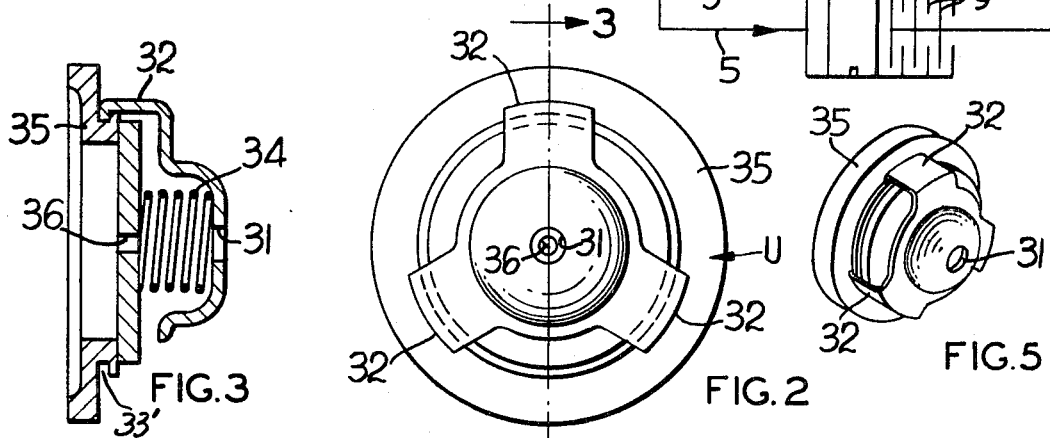
FIG. 2 is an enlarged, elevational view of the combined orifice and check valve unit mounted in the poppet.
FIG. 3 is a cross-sectional view taken along line 3—3 in FIG. 2.
FIG. 5 is a perspective view of the unit.

The fluid circuit shown in FIG. 1 for the purpose of illustrating the present invention includes a fluid pump P which delivers pressure fluid to a manually operated control valve CV which in turn then delivers pressure fluid via conduit 1 to the valve V which is made in accordance with the present invention. Fluid pressure thus enters the valve V by means of the inlet 2 and is discharged from the outlet 3 in the valve body 4 and through the fluid line 5 to the hydraulically actuated device, such as a friction clutch 6. The clutch itself is of conventional character and includes a clutch-actuating chamber 7, an actuating piston 8 slideable in the chamber 7 and which abuts against the interleaved friction plates 9 to cause their clamp-up and consequent engagement of the clutch.

Referring in greater detail to the valve itself, the body 4 includes a centrally and axially positioned bore means 10 having an internal thread 11 at its outer end in which an adjusting nut 12 is threadably engaged. The bore means 10 extends for the substantial length of the body, that is up to the closed end 14 of the body. The bore means 10 is in fluid communication with the inlet 2 and the outlet 3. As will appear, fluid can be dumped through the fluid dump port 16 formed by the open end of the valve body.

Slideably mounted within one end of the bore means 10 is the regulating piston 17 which is urged to the left, as viewed in FIG. 1, by means of the main spring 18 which abuts against the shoulder 19 of the piston and the adjusting nut 12. The position of the nut can be adjusted to vary the spring setting, that is to say, to adjust the bias imposed on the piston 17.

The valve also includes a poppet 20 which is slideable in the other end of the bore means 10 and when the poppet is moved to the extreme left position, it abuts against the wall 14 of the housing. A chamber 21 is formed in back of the poppet, thus exposing a portion of the end of the poppet to pressure fluid, as will appear. The poppet, as well as the piston, slide in the bore means 10 and form a sliding seal therewith so that pressure fluid cannot readily pass between the bore and the poppet and piston.

It will be noted the inner end of the poppet, which is adjacent the piston, is formed as a generally frustoconical surface 22, the nose of which enters the central opening 23 in the inner end of the piston. Thus, a fluid valve FV is formed between the nose portion of the poppet and the adjacent, central opening 23 of the piston.

The valve V has been shown with the poppet and piston in the fluid valve FV closed position in which both the poppet and piston are moved to one end of the valve body and abut against one another thereby closing the dump port 16 from the flow of fluid from the inlet 2. In this position the spring 18 holds the position against the nose of the poppet.

The poppet includes a bore 24 formed at its outer end and also has a passage 25 that places the bore in communication with the bore means 10 of the valve body and thus in communication with the inlet 2 in the valve body.

A combined orifice and check valve unit U is removably mounted in the bore 24 of the poppet and held therein by a snap ring 27. This unit U includes a pressed steel enclosure It for instance drawn from a sheet of steel, which enclosure has an opening 31 at one end, and has three circumferentially spaced arms 32 having edges that clamp in a groove 33 formed in the periphery of a circular valve seat 35. The check valve includes a valve plate 33 slideably mounted in the enclosure 30, and a small relatively weak spring 34 which urges the plate against the valve seat 35 which is clamped in the enclosure 30. it will also be noted that the valve plate 33 has a central orifice 36 which is in communication with the passage 25. When the plate 33 is off its seat 35, fluid can flow freely around it.

The operation of the valve V is as follows. Pressure fluid initially flows directly through the valve from inlet 2, around the poppet which is smaller than bore means 10, through outlet 3 and to the clutch. This full flow rapidly brings all clutch plates together, thereby building up a resistance to flow. This increased pressure in the line and valve V rises to the cracking point of the valve V and then causes piston 17 to begin to move (to the right as viewed in the drawings) thereby opening the fluid valve FV, that is to say, thereby permitting excess fluid to flow between the poppet and the piston and out of the fluid dump port 16.

The cracking pressure of the valve is determined by spring 18 and the effective piston area. In this manner, as the fluid flows from the inlet 2 to the output 3 and the member being actuated, the excess fluid then flows through the central portion of the piston and out of the dump port 16 at the end of the valve body and to the tank T. Thus by relieving the excess fluid, pressure at the clutch 6 is not of maximum magnitude.

At the same time pressure fluid is forcing the piston to the right as viewed in the drawings, some of the pressure fluid also enters passage 25, passes through orifice 36 and into chamber 21 at the outer end of the poppet. Pressure in chamber 21 thus builds up and initiates movement of the poppet to the right, that is in the same direction as the piston has been moved. As the poppet moves to the right due to the orificed flow into chamber 21, the fluid valve FV is reduced and eventually closes due to the fact that the poppet nose abuts into the central opening of the piston.

As the piston moves to the right, continually relieving the fluid flow, the force of the main spring 18 increases, thereby requiring a higher pressure to force the fluid through the valve opening. Piston movement stops when pressure reaches the system relief valve setting or the piston bottoms on its stop 12. The poppet continues movement until it abuts against the piston. As a result, full fluid pressure is available from the inlet 2 and to the outlet 3, line 5, and to the member being actuated.

The time delay due to the action of the valve V of the entire flow of fluid to the clutch is very small, say on the order of 2 seconds, but this permits a gradual pressure rise in the clutch and consequently, a much smoother and shock-free actuation of the clutch.

When the clutch pressure is released, the spring 18 forces the piston and poppet to the left. The check valve formed by plate 33 and its seat 35 allows the free flow of fluid from the outer end of the poppet and permits rapid return of the parts to a normal disengaged position. Otherwise, with no check valve, the oil behind the poppet would have to go out the orifice again.

By combining the orifice and check valve in the unit, the assembly can be easily inserted in and removed from the body of the valve.

Figure 4:
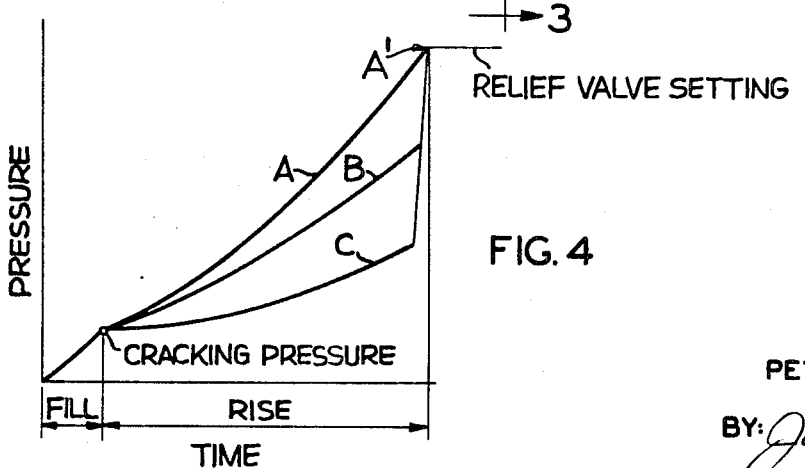
FIG. 4 is a diagram showing the present range controlled by valves made in accordance with the present invention and having springs of different rates.

FIG. 4 is a graph showing the pressure of the fluid plotted against time from the point at which the valve commences to be pressurized. Both pressure rise and clutch fill time are shown. The line A is for a valve having a spring 18 which is relatively stiff, plot B is for a valve having an intermediate rate spring and plot C is for a valve having a soft spring. These lines indicate the pressure range that is controlled by the valve made in accordance with the present invention. As shown in plot A, the point A' indicates where the valve closes. Point A' in plot A happens to be at the relief valve setting Plot B and C both are of springs which bottom out at pressures less than the relief valve setting. It will be seen that by varying the rate of the spring, different ranges of control can be readily provided for the valve.

RESUME

The present invention provides a control rate of pressure rise valve utilizing a piston and a poppet, both of which move in the same direction and which together form the actual valve opening. Pressure against a spring-loaded piston opens the valve allowing fluid passage to tank. The orifice-controlled poppet follows the piston eventually closing off the valve opening. The spring which loads the piston in turn determines the pressure range of the valve. The check valve provided in the present arrangement insures quick dump of the fluid behind the poppet and consequently, a quick reset feature for the valve.

I claim:

1. A controlled rate of pressure rise valve comprising: a housing having an inlet, an outlet, a fluid dump port, and a bore means between said inlet and outlet; a piston slideable in said bore means, a poppet slideable in said bore means, said piston and poppet disengageably abuttable with one another to form a fluid valve; said piston slideable from an abuttable position with said poppet in which said dump port is closed to fluid flow, to a nonabutting position with said poppet in which said piston has shifted away from said poppet thereby opening said dump port to fluid flow from said inlet; said poppet being of such a size in relation to said bore means so as to permit pressure fluid to flow from said inlet to said outlet when said poppet and piston abut with one another; said poppet having an orifice and a check valve means, a passage in said poppet and placing said bore means in communication with said orifice and said check valve means, a poppet actuating chamber defined by said housing and one end of said poppet located remote from said piston, said passage also being in communication with said chamber whereby fluid pressure from said inlet is directed through said passage and said orifice and into said chamber to thereby cause said poppet to shift towards said piston, said check valve means being operative to dump fluid pressure from said chamber when the pressure fluid in said bore means is reduced.

2. The valve as set forth in claim 1 further characterized in that said poppet has an inner end of frustoconical shape, and said piston has a central opening at its other end which is adjacent said poppet, whereby said frustoconical shape is engageable in said central opening to form said fluid valve between said poppet and piston.

3. The valve as set forth in claim 1 including a removable enclosure in said poppet, and said orifice and said check valve means are mounted in said enclosure as a unit, and means for securing said unit in said poppet.

4. The valve as set forth in claim 2 including a removable enclosure in said poppet, and said orifice and said check valve means are mounted in said enclosure as a unit, and means for securing said unit in said poppet.

5. The combination set forth in claim 1 including a spring acting between said housing and said piston and urging the latter in a direction towards said poppet.

6. The combination set forth in claim 2 including a spring acting between said housing and said piston and urging the latter in a direction towards said poppet.

7. A device as set forth in claim 3 further characterized in that said enclosure is drawn from sheet steel, and said check valve means includes a shiftable plate and a valve seat for said plate both in said enclosure, and said orifice is located in said valve plate.

8. A controlled rate of pressure rise valve comprising: a housing having an inlet, an outlet, a fluid dump port; a piston slideable in said housing, a poppet slideable in said housing, said piston and poppet disengageably abuttable with one another to form a fluid valve; said piston slideable from an abuttable position with said poppet in which said dump port is closed to fluid flow, to a nonabutting position with said poppet in which said piston has shifted away from said poppet thereby opening said dump port to fluid flow from said inlet; said poppet having an orifice and a check valve means, a passage in said poppet and placing said inlet in communication with said orifice and said check valve means, said passage also being in communication with the outer end of said poppet which is remote from said piston, whereby fluid pressure from said inlet is directed through said passage and said orifice and against said poppet outer end to thereby cause said poppet to shift towards said piston, said check valve means being operative to dump fluid pressure from said outer end of said poppet when the pressure fluid in said inlet is reduced.

9. The valve as set forth in claim 8 further characterized in that said poppet has an inner end of frustoconical shape, and said piston has a central opening at its other end which is adjacent said poppet, whereby said frustoconical shape is engageable in said central opening to form said fluid valve between said poppet and piston.

10. The valve as set forth in claim 8 including a removable enclosure in said poppet, and said orifice and said check valve means are mounted in said enclosure as a unit, and means for securing said unit in said poppet.

11. The valve as set forth in claim 9 including a removable enclosure in said poppet, and said orifice and said check valve means are mounted in said enclosure as a unit, and means for securing said unit in said poppet.

12. The combination set forth in claim 8 including a spring acting on said piston and urging the latter in a direction towards said poppet.

13. The combination set forth in claim 9 including a spring acting on said piston and urging the latter in a direction towards said poppet.

14. A device as set forth in claim 10 further characterized in that said enclosure is drawn from sheet steel, and said check valve means includes a shiftable plate and a valve seat for said plate both in said enclosure, and said orifice is located in said valve plate.

15. A controlled rate of pressure rise valve comprising; a housing having an inlet, an outlet, a fluid dump port, and a bore means between said inlet and outlet; a piston having an inner end with a central opening and slideable in said bore means, a poppet having an inner end of frustoconical shape and slideable in said bore means, said frustoconical shape of said poppet and the opening of said piston being disengageably abuttable to form a fluid valve; a spring acting between said housing and piston to urge the latter towards said poppet, said piston slideable from an abuttable position with said poppet in which said dump port is closed to fluid flow, to a nonabutting position with said poppet in which said piston has shifted away from said poppet thereby opening said dump port to fluid flow from said inlet; said poppet being of such a size in relation to said bore means so as to permit pressure fluid to flow from said inlet to said outlet when said poppet and piston abut with one another; said poppet having a removable enclosure mounted therein, a check valve in said enclosure including a valve seat and a shiftable valve plate abuttable with said seat, and an orifice in said plate; a passage in said poppet and placing said bore means in communication with said orifice and said check valve means; a poppet actuating chamber defined by said housing and one end of said poppet located remote from said piston, said passage also being in communication with said chamber whereby fluid pressure from said inlet is directed through said passage and said orifice and into said chamber to thereby cause said poppet to shift towards said piston, said check valve means being operative to dump fluid pressure from said chamber when the pressure fluid in said bore means is reduced.

* * * * *